US011526558B2

(12) United States Patent
Duong et al.

(10) Patent No.: US 11,526,558 B2
(45) Date of Patent: Dec. 13, 2022

(54) SYSTEM AND METHOD OF PROVIDING ACCESSIBILITY TO VISUALIZATION TOOLS

(71) Applicant: MICROSOFT TECHNOLOGY LICENSING, LLC, Redmond, WA (US)

(72) Inventors: Thuy Thanh Duong, Seattle, WA (US); Luis Carlos Tovar Garcia, Seattle, WA (US); Eric David Gradel, Seattle, WA (US); James Edward Jackson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/107,632

(22) Filed: Nov. 30, 2020

(65) Prior Publication Data
US 2022/0171810 A1 Jun. 2, 2022

(51) Int. Cl.
*G06F 16/904* (2019.01)
*G06F 16/9038* (2019.01)
*G06F 16/901* (2019.01)

(52) U.S. Cl.
CPC ........ *G06F 16/904* (2019.01); *G06F 16/9024* (2019.01); *G06F 16/9038* (2019.01)

(58) Field of Classification Search
CPC ........... G06F 16/84578; G06F 16/9038; G06F 16/9024
See application file for complete search history.

(56) References Cited

U.S. PATENT DOCUMENTS

| 10,025,862 | B2 | 7/2018 | Gramatica |
| 10,437,884 | B2 | 10/2019 | Mital et al. |
| 2004/0098381 | A1* | 5/2004 | Parikh .................. G06F 16/322 |
| 2010/0134261 | A1 | 6/2010 | Heimendinger |

(Continued)

OTHER PUBLICATIONS

Brown et al., "Design guidelines for audio presentation of graphs and tables", Jul. 2003, Int'l Conference on auditory display, 9th proceedings, pp. 284-287 (Year: 2003).*

(Continued)

*Primary Examiner* — Taelor Kim
(74) *Attorney, Agent, or Firm* — NovoTechIP International PLLC

(57) ABSTRACT

A method and system for providing accessibility to a visualization graph may include receiving a request to begin navigating the visualization graph, the visualization graph displaying a plurality of items of information, each item of information being displayed as a node and the visualization graph representing a connection between two nodes with a connecting line, identifying a central node in the visualization graph, determining a navigation order for the visualization graph based on at least one of a strength of the connection and a type of the connection between an item of information associated with the central node and items of information associated with non-central nodes, starting to navigate the visualization graph at the central node, continuing to navigate the visualization graph to non-central nodes in accordance with the determined navigation order, and providing an audio output during the navigation to provide accessibility to the visualization graph for visually impaired individuals.

20 Claims, 7 Drawing Sheets

(56) References Cited

U.S. PATENT DOCUMENTS

| | | | |
|---|---|---|---|
| 2014/0053055 A1* | 2/2014 | Summers, II | G09B 5/02 |
| | | | 715/234 |
| 2014/0222433 A1* | 8/2014 | Govrin | G06Q 40/02 |
| | | | 704/260 |
| 2014/0372956 A1* | 12/2014 | Bisca | G06F 16/93 |
| | | | 715/848 |
| 2016/0094889 A1 | 3/2016 | Venkataraman et al. | |
| 2019/0188332 A1 | 6/2019 | Ingvaldsen et al. | |
| 2020/0250562 A1 | 8/2020 | Bly | |

OTHER PUBLICATIONS

"GraphWords", Retrieved from: https://graphwords.com/word/home, Retrieved Date: Oct. 1, 2020, 3 Pages.

Grainger, et al., "The Semantic Knowledge Graph: A compact, auto-generated model for real-time traversal and ranking of any relationship within a domain", In Proceedings of the IEEE International Conference on Data Science and Advanced Analytics, Oct. 17, 2016, 10 Pages.

Hirsch, et al., "Interactive Visualization Tools for Exploring the Semantic Graph of Large Knowledge Spaces", In Workshop on Visual Interfaces to the Social and the Semantic Web, Feb. 8, 2009, pp. 1-6.

Niu, et al., "DeepDive: Web-scale Knowledge-base Construction using Statistical Learning and Inference", In Journal of VLDS, vol. 12, Aug. 31, 2012, 4 Pages.

"International Search Report and Written Opinion Issued in PCT Application No. PCT/US2021/056805", dated Feb. 10, 2022, 11 Pages.

\* cited by examiner

| 1 | Project Speed: This is a confirmed topic with 5 related topics, 3 of which are confirmed topics and 2 of which were discovered. |
|---|---|
| 2 | Confirmed strong connection between Project Speed and Survey. Press enter for connection description. |
| 3 | Survey: This is a confirmed topic with 3 related topics, 2 of which are confirmed topics and 1 of which was discovered. Press enter to make the topic the focal point and refresh visualization. Press the space bar for a description of the topic. |
| 4 | Confirmed moderate connection between Project Speed and Structural Integrity. Press enter for connection description. |
| 5 | Structural Integrity: This is a confirmed topic with 2 related topics, 1 of which is a confirmed topic and 1 of which was discovered. Press enter to make the topic the focal point and refresh visualization. Press the space bar for a description of the topic. |

FIG. 3B

SYSTEM AND METHOD OF PROVIDING ACCESSIBILITY TO VISUALIZATION TOOLS

TECHNICAL FIELD

This disclosure relates generally to improving accessibility of knowledge network visualization tools, and, more particularly, to a method of and system for providing access to knowledge network visualization graphs for visually impaired individuals.

BACKGROUND

With the large amount of information available in computer networks, it is often useful to determine how various items of information are related to each other. For example, it is beneficial to know how a project in an enterprise is related to various other projects in the enterprise. Similarly, it may be useful to understand the relationship between various concepts (e.g., different words, various scientific concepts, different people and the like). To provide this information, knowledge networks have been developed that determine associations between different items of information and provide an overview of the relationships between one or more of those items.

The relationships between various items of information may be provided in knowledge network visualizations that display the relationships in an easily decipherable manner. The knowledge network visualizations include visualization graphs that utilize various visualization tools to visualize the strength and/or degree of connection between various items of information. The visualization tools may include different shapes, colors, lines and sizes. While such tools are useful in easily conveying relationship information to users who can view the visualization graph, they do not provide sufficient information to users with impairments (e.g., visual impairment). As a result, and because of the complexity of knowledge network visualization graphs, such knowledge network visualizations are often inaccessible to users having a disability or impairment.

Hence, there is a need for systems and methods of providing accessibility to knowledge network visualizations.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving a request to begin navigating a visualization graph, the visualization graph displaying a plurality of items of information, each item of information being displayed as a node and the visualization graph representing a connection between nodes, identifying a central node in the visualization graph, determining a navigation order for the visualization graph based on at least one of a strength of the connection and a type of the connection between an item of information associated with the central node and items of information associated with non-central nodes, starting to navigate the visualization graph at the central node, continuing to navigate the visualization graph to the non-central nodes in accordance with the determined navigation order, and providing an audio output during navigation of the visualization graph to provide accessibility to the visualization graph for visually impaired individuals.

In yet another general aspect, the instant disclosure describes a method for providing accessibility to a visualization graph. The method may include receiving a request to begin navigating the visualization graph, the visualization graph displaying a plurality of items of information, each item of information being displayed as a node and the visualization graph representing a connection between nodes, identifying a central node in the visualization graph, determining a navigation order for the visualization graph based on at least one of a strength of the connection and a type of the connection between an item of information associated with the central node and items of information associated with non-central nodes, starting to navigate the visualization graph at the central node, continuing to navigate the visualization graph to the non-central nodes in accordance with the determined navigation order, and providing an audio output during navigation of the visualization graph to provide accessibility to the visualization graph for visually impaired individuals.

In a further general aspect, the instant disclosure describes a non-transitory computer readable medium on which are stored instructions that when executed cause a programmable device to receive a request to begin navigating a visualization graph, the visualization graph displaying a plurality of items of information, each item of information being displayed as a node and the visualization graph representing a connection between nodes, identify a central node in the visualization graph, determine a navigation order for the visualization graph based on at least one of a strength of the connection and a type of the connection between an item of information associated with the central node and items of information associated with non-central nodes, start to navigate the visualization graph at the central node, continue to navigate the visualization graph to the non-central nodes in accordance with the determined navigation order, and providing an audio output during navigation of the visualization graph to provide accessibility to the visualization graph for visually impaired individuals.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A-3B depict the navigation order for providing accessibility to an example knowledge network visualization graph.

DETAILED DESCRIPTION

Figure 1:
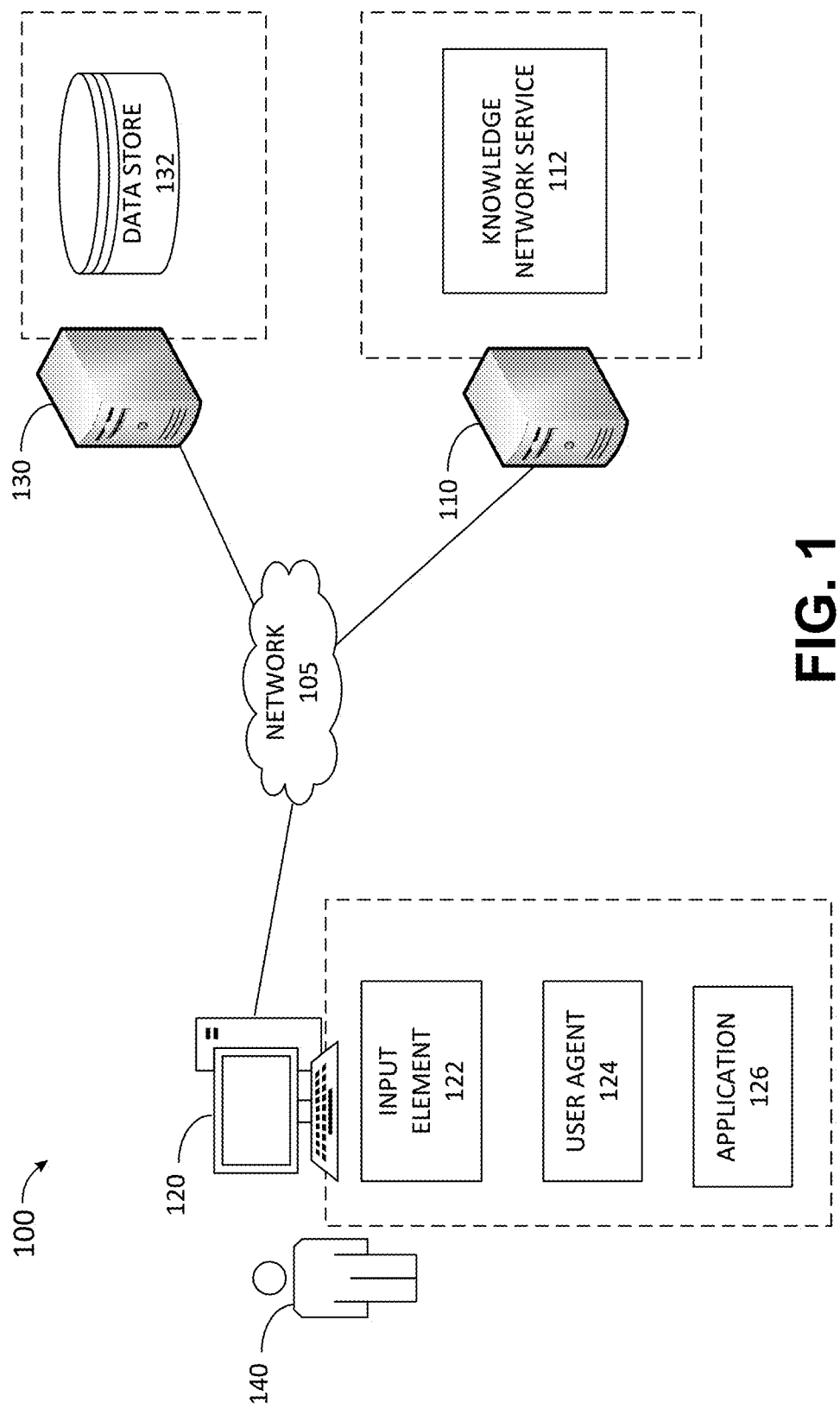
FIG. 1 depicts an example of a system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Knowledge network visualization graphs are often used to provide a visual display of relationships between various items of information. These types of visualization graphs often utilize various visualization tools to provide an easily understandable network of connections between the various items of information shown on the graph. For example, each item of information may be displayed as a node (e.g., a circle). Connecting lines may then be used to connect each node to one or more other nodes based on the relationships between the different nodes. Different line styles (e.g., solid and dotted lines) and line thicknesses may be used to convey the strength of connection between various nodes. While such visual cues are very helpful to users who can view the visualization graphs, they provide no indication to users with visual or other impairments. As such, there exists a technical problem of providing access to knowledge network visualization graphs for all users.

Moreover, because of the complexity of relationships displayed by knowledge network visualization graphs, it is challenging to convey the relationships accurately and in an easily understandable manner without the use of visual tools. Thus, there exists another technical problem of conveying complex relationships between items of information to visually impaired users and/or users who are keyboard only users.

To address these technical problems and more, in an example, this description provides a technical solution for navigating from a central item of information in a visualization graph to other related items of information based on the strength and/or type of connections between the central item of information and the other items of information. To do so, techniques may be used to take into account the degree of connection and/or type of connection between various items of information and the central item of information, sort the items of information based on their degree of connection and/or type of connection to the central item of information, and provide a tool for navigating between the different items of information based on the degree and/or type of connection. In some implementations, this is achieved by using one or more keys of the keyboard. For example, specific keys of the keyboard may be used for navigating between different items of information, while others may result in an audio output (e.g., reading) of labels and/or descriptions of the items of information and/or the types and degree of connection between them. This may enable the users to easily navigate and gain an understanding of connections between items of information displayed by a knowledge network visualization graph by utilizing a keyboard.

As will be understood by persons of skill in the art upon reading this disclosure, benefits and advantages provided by such implementations can include, but are not limited to, a technical solution to the technical problem of lack of accessibility in current computer systems to knowledge network visualization graphs. The technical solutions may enable all user to quickly and accurately navigate and gain information from knowledge network visualization graphs even if they cannot visually view the graphs. The benefits provided by these technology-based solutions yield more user-friendly mechanisms for providing access to complex visualization graphs to as many as people as possible, thus improving accessibility.

As used herein, the terms "item of information," may refer to a unit of information such as a concept, project, topic, resource, person and the like, which may be related to other items of information. Furthermore, as used herein, the term "relationship" or "connection" may refer to an association between two items of information. The term "user" may refer to a person who utilizes a computing device. Moreover, the term "knowledge network visualization graph" may be used to refer to a graph that displays relationships between different items of information.

FIG. 1 illustrates an example system 100, upon which aspects of this disclosure may be implemented. The system 100 may include a server 110 which may include and/or execute a knowledge network service 112 and a client device 120. The server 110 may operate as a shared resource server located at an enterprise accessible by various computer client devices such as client device 120. The server may also operate as a cloud-based server for offering global knowledge network services. Although shown as one server, the server 110 may represent multiple servers for performing various different operations.

The knowledge network service 112 may operate as the backend engine for performing knowledge network analysis and determinations. The knowledge network service 112 may access one or more data sets and utilize one or more machine-learning (ML) models to identify relationships between various items of information stored in the data sets. The relationships may be determined based on a number of factors. In some implementations, one or more users may be able to provide information regarding the degree of connection between various items of information. For example, the users may be able to indicate that two items of information are directly related. In another example, a user may be able to confirm and/or reject a relationship identified by the knowledge network service 112. Information regarding the identified relationships may be provided by the knowledge network service 112 to client devices such as client device 120 for display.

The server 110 may be connected to (e.g., via a network 105) or include a storage server 130 containing a data store 132. The data store 132 may function as a repository in which one or more data sets containing data about various items of information and/or their relationships with one another is stored. In one implementation, data store 132 may also include one or more data sets containing training data for training the ML models used in determining the relationships between different items of information.

The client device 120 may be connected to the server 110 via the network 105. The network 105 may be a wired or wireless network(s) or a combination of wired and wireless networks that connect one or more elements of the system 100. The client device 120 may be a personal or handheld computing device having or being connected to input/output elements that enable a user 140 to interact with content such as a knowledge network visualization graph. Examples of suitable client devices 120 include, but are not limited to, personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 5 and 6.

The client device 120 may include an application 126 and a user agent 124. The application 126 may be a computer program executed on the client device 120 that configures the device to be responsive to user input. User input may include input received via an input element 122 that enables the user 140 to interactively access information such as information provided by a knowledge network visualization graph. In some implementations, the application 126 provides a user interface (UI) that allows the user to interact with a knowledge network visualization graph. The application 126 may receive data such as display data for presenting the knowledge network visualization graph on the UI from the knowledge network service. Alternatively and/or additionally, the application 126 may itself process data to determine relationships between items of information and provide display data for the knowledge network visualization graph.

In one implementation, the knowledge network visualization graphs may be provided by one or more online services accessed via a user agent 124, such as a browser, executing on the client device 120. The user agent 124 may provide a UI that allows the user 140 to interact with knowledge network visualization graphs provided by a service such as the knowledge network service 112 via a webpage. The user agent 124 may access the webpage or online service via the network 105. In some examples, the user agent 124 may include or work with one or more application programming interfaces (APIs) to provide accessibility features to knowledge network visualization graphs.

The input element 122 may include an input device such as a keyboard for providing user input to the client device 120. The user input may include selection (e.g., pressing) of specific keyboard keys for invoking one or more accessibility features of a visualization graph. For example, selection of certain keyboard keys may lead to navigating the visualization graph. The navigation may be performed based on the type and/or strength of connections between items of information in the graph, as discussed in more detail below. Thus, the application 126 and/or user agent 124 may function as a tool that enables the user 140 to interact with a knowledge network visualization graph.

Figure 2:
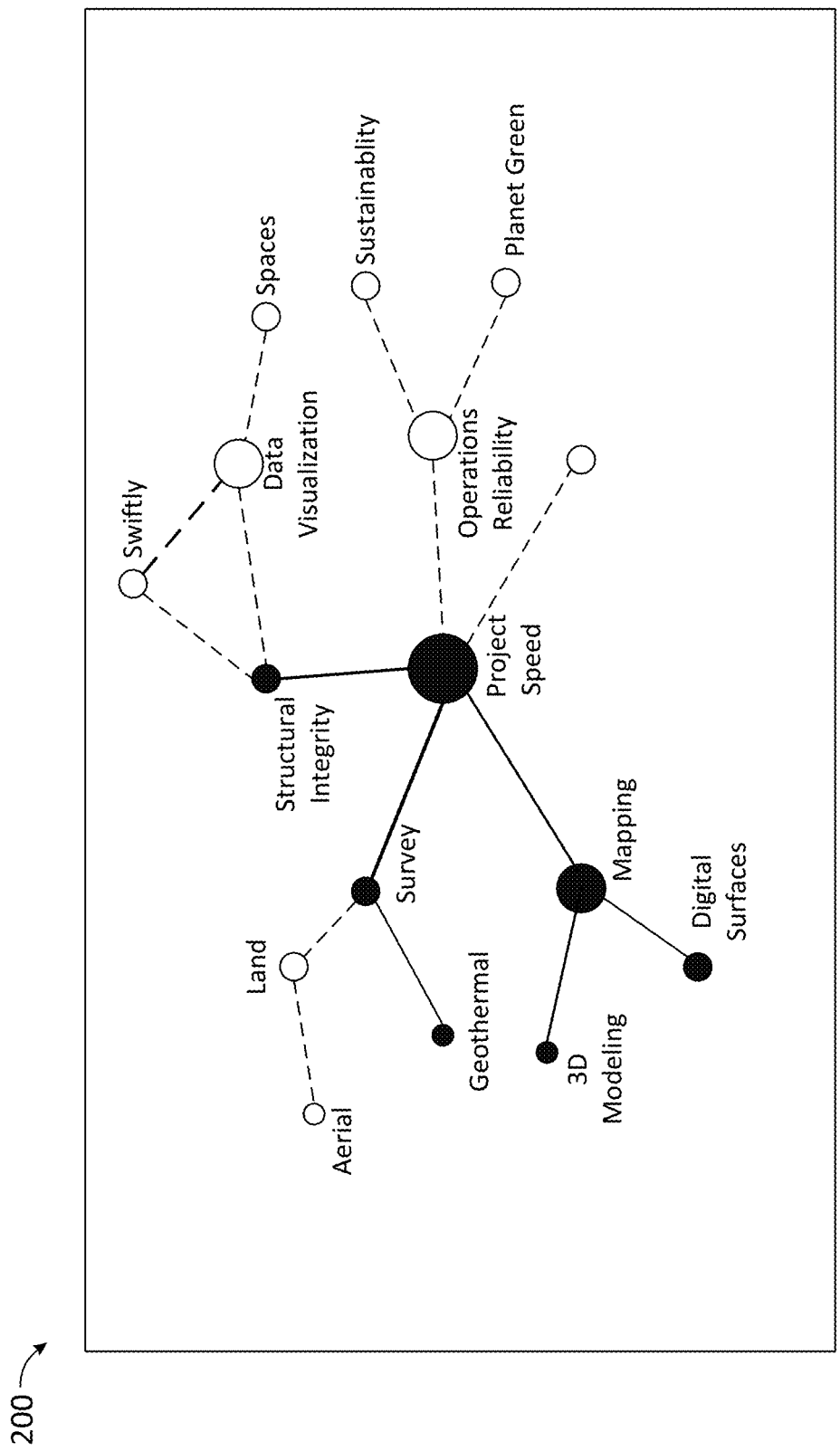
FIG. 2 is an example of a knowledge network visualization graph used for displaying how various items of information in the graph are related.

FIG. 2 shows an example knowledge network visualization graph 200 used for displaying how various items of information in the graph are related. In one implementation, the knowledge network visualization graph displays how a plurality of items of information are connected to a central item of information. For example, graph 200 depicts how the central item of information "Project Speed" is connected to various other items of information. This may include displaying items of information that are directly related to the central item and other items of information that are indirectly related to the central item.

In some implementations, the graph may also utilize a visual cue to display the type of connection between items of information. For example, different shapes and/or colors may be used to differentiate between various types of connections. The types of connections may vary depending on the knowledge network visualization graph. For example, the types of connections may include direct connection, indirect connection, a connection added or confirmed by a person, and a computer-suggested connection (e.g., ML model), among others.

In graph 200, connections that are confirmed or added by a human are identified by using dark nodes, while computer-identified connections are identified by displaying white nodes. Furthermore, if the connection between two items of information is confirmed or added by a human, the line connecting the two items may be displayed as a solid line, while a line connecting two items that were identified as being connected by a computer program may be a dotted line. In an example, the width of the connecting lines corresponds with the strength of the connection between two items of information. As such, items that are identified as having a strong connection may be connected by a thick line, while items having weaker connections may be connected by a thin line. The strength of the connection between two items of information may depend on the number of factors connecting the two items. For example, for two items of information that a person has confirmed are connected, the strength may depend on the number of persons that have identified the items as being connected. Furthermore, the strength may depend on other factors such as whether the two items were identified by a ML model as being connected, the number of people who are associated with both items, and the like.

In some implementations, the size of the node (e.g., size of the circle) representing each item of information varies depending on the number of direct connections the item of information has. For example, because "Project Speed" has 5 direct connections, the size of the node representing it is larger than the size of "Mapping" which only has 3 direct connections. In an example, selecting a node label (e.g., clicking on a label below a circle) may result in the display of a UI element that provides additional information about the item of information associated with the node. For example, when the user clicks on the node label representing "Project Speed" a pop-up window may be displayed that provides additional information about "Project Speed." The additional information may include a description of "Project Speed," a list of items of information directly connected to "Project Speed," a list of people associated with "Project Speed," and the like.

Thus, various visual cues such as different shapes, colors, and sizes may be used in a knowledge network visualization graph to display a network of connections between different items of information. The resulting graph can quickly and efficiently enable a viewer to gain an understanding of connections between different items of information and allow them to determine how various items of information are related. This information can be used in a variety of different fields. For example, an enterprise can utilize such a knowledge network visualization graph to provide an overview of the way in which a project is related to various teams, other projects, and/or people. In another example, an enterprise may use a knowledge network visualization graph to present how people in a team are connected with each other. Furthermore, the knowledge network visualization graph may be utilized to display connections between various concepts. This may include scientific concepts, social concepts, political concepts, and the like. Sometimes the knowledge network visualization graphs include a significant number of items of information and as such may be very complex. Despite their complexity, knowledge network visualization graphs may enable users to quickly gain an understanding of relationships between various items of information by utilizes several visual cues. Because the connections, types of connections and/or strength of connections between items of information in a knowledge network visualization graph are conveyed via visual cues, and since knowledge network visualization graphs are often complex and include many items of information, providing access to these graphs for visually impaired individuals can be very challenging.

To address this technical challenge, this disclosure provides a keyboard navigation mechanism that navigates the knowledge network visualization graph based on the connections, types and/or strength of connections between various items of information. This may be achieved by providing a user-experience that is responsive to user input, navigates a knowledge network visualization graph based on parameters related to connectedness and provides audio cues, as needed, to offer a comprehensive understanding of the knowledge network visualization graph even if the user cannot view the graph.

The interactive user-experience may be provided by enabling the user to navigate through the graph from a central item of information to related items of information based on the type and/or strength of the connections between the items. The navigation order may begin at the central node (e.g., the item of information that is located at the center of the graph) and proceed to the strongest human-confirmed connection. From there, the navigation may proceed to the second strongest human-confirmed connection and so on until all human-confirmed connections have been visited. After all the human-confirmed connections have been traversed, the navigation may proceed to the strongest computer-identified connection and then to the second strongest computer-identified connection and so on. Once the navigation cycles through all the central node's first-degree connections, the same navigational logic may apply to second degree connections and subsequently to third degree connections and others until all items of information have been traversed.

Figure 3A:
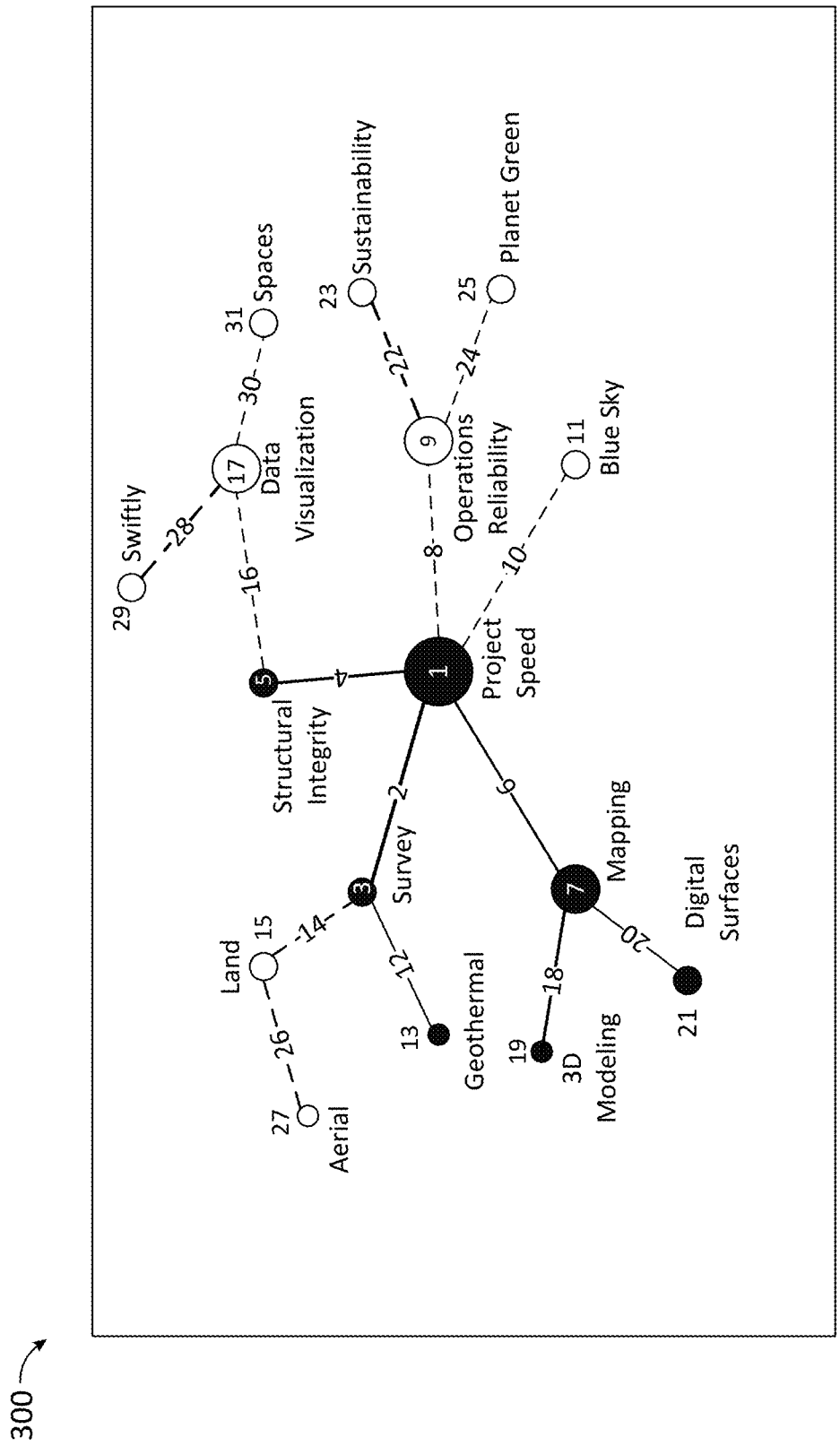

This navigation mechanism is illustrated in the knowledge network visualization graph 300 of FIG. 3A, which depicts a navigation order for providing accessibility to an example knowledge network visualization graph 300. As illustrated, navigating the graph 300 may begin at node 1 which is the central node of the graph 300. This is because, knowledge network visualization graphs often include a central node which may be the main focus of the graph and as such, the main item of information in the graph. In one implementation, the user can select any item of information in the graph as the focal point which may result in reordering of the graph to make the selected topic the focal point.

Navigating the knowledge network visualization graph may begin by receiving specific user input. In an example, the user input may include selection of a specific key on a keyboard. For example, pressing the tab key or the space bar may begin the process of navigating the graph. In some implementations, one or more features may be made available via a UI of the application and/or browser displaying the knowledge network visualization graph to allow the user to enable (e.g., turn on) accessibility features. For example, the UI displaying the knowledge network visualization graph 300 may include a button for enabling accessibility features for visually impaired individuals. Alternatively, the information about accessibility needs of the user may be stored in an account (e.g., a user account or profile) associated with the client device and may be accessed via the application, service and/or browser providing the knowledge network visualization graph to determine the accessibility needs of the user. In some implementations, once accessibility features are enabled, audio cues may be output to provide information and/or instructions to the user on how to proceed to navigate a knowledge network visualization graph. For example, an audio output may be provided that explains to the user a knowledge network visualization graph is displayed on the page and that the user can begin navigating the graph by pressing a specific key on the keyboard (e.g., pressing the tab key).

Once the user presses the specified key, the navigation may begin at the central node and proceed in the navigation order discussed above. Thus, for the graph 300, navigation may begin at node 1, proceed to connection 2 and continue to node 3. This is because the connection between nodes 1 and 3 is a priority type of connection (e.g. a human-confirmed connection) and is the strongest of the priority type connections. This is illustrated on the graph 300 by the thickness of the connecting line between nodes 1 and 3. However, since a visually impaired user cannot view the connection, the navigation order begins at this connection to inform the user of the strength and type of connection. The navigation may continue from node 3 to connection 4 and node 5 as illustrated, since the connection between node 1 and node 5 is the next strongest connection. Navigating through the graph may continue to connection 6, node 7 and so on (nodes 11, 13, 15, 17, 21, 23, 25, 27, 29 and 31) until all nodes and connections have been visited.

In some implementations, each step of the navigation process may require additional user input. For example, a first user input (e.g., pressing the key tab) may begin the navigation process, but further navigating may require another user input (e.g., another press of the key tab). Thus, each additional user input may lead to one additional navigation step. Each user input may also lead to audio outputs that inform the user of the type of connection and/or provide information about the item of information to which the navigation has proceeded. Some user inputs may result in receiving basic information about the item of information, while others may lead to receiving additional information. In some implementations, different user inputs may result in additional audio information (e.g., additional audio output). For example, pressing the enter key while on a node may result in an audio description of the item of information associated with the node. In other implementations, pressing the same key (e.g., the tab key) while on the node may also result in an audio description of the item of information associated with the node.

FIG. 3B depicts a partial example navigation order and associated output for navigating the graph 300 of FIG. 3A. Thus, in an example, upon display of the knowledge network visualization graph 300, the user may provide a specific user input such as pressing the tab key. This may initiate navigation of the graph 300 and lead to step 1 in the navigation order. Step 1 may involve beginning the navigation from the central node 1 and providing an audio output relating to the item of information associated with node 1 (e.g., Project Speed). The audio input may include the label for node 1, explain the type of item of information the node relates to (e.g., human-confirmed topic, discovered topic, etc.), provide a list of connections and/or the types of connections for node 1. Thus, the audio output at step 1 may read "Project Speed: This is a confirmed topic with 5 related topics, 3 of which are confirmed topics and 2 of which were discovered." A subsequent (e.g. a second pressing of the tab key) may result in proceeding to step 2 of the navigation process, which may involve moving to the connection between nodes 1 and 3 (i.e., connection 2). This may result in an audio output that describes the connection (e.g., "Confirmed strong connection between Project Speed and Survey"). In some implementations, the audio output may include information about how other user inputs may provide additional information. For example, at step 2, the audio output may explain that the enter key may be pressed for receiving a description of the connection. If the user chooses to provide the suggested input (e.g., press the enter key), an audio output describing the type of connection may be provided. The description may include information about the nodes and/or information on how or why the nodes are connected.

A subsequent user input (e.g., a third pressing of the tab key) may move the navigation forward to the third step. This may involve navigating to node 3 and providing an audio output relating to node 3. The audio output may provide the label for the node, describe the type of connection between the central node and the new node, and provide additional information about other nodes with which node 3 has connections. Thus, step 3 in navigation of graph 300 may result in an audio output that reads "Survey: This is a confirmed topic with 2 related topics, one of which is a confirmed topic and one of which was discovered. Press enter to make the topic the focal point and refresh visualization. Press the space bar for a description of the topic." In some implementations, specific user inputs on secondary items of information (e.g., non-central items of information) may lead to an audio output that provides additional information about the item of information. For example, while at step 3, pressing the space bar (or pressing the tab key) may result in an output that provides a description of the topic "Survey." This may include further information about the item of information. For example, a description of "Survey," list of people associated with "Survey," list of people who confirmed the connection between Survey and Project Speed and the like may be provided.

Once node 3 has been visited, a subsequent user input (e.g., another pressing of the tab key) may move the navigation forward to step 4. This may lead to moving to the next strongest connection between the central node and a confirmed connection. Thus, the navigation may move to connection 4 and the resulting audio output may read "Confirmed moderate connection between Project Speed and Structural Integrity. Press enter for connection description." Upon receiving appropriate user input (e.g., another pressing of the tab key), the navigation process may continue until all nodes have been visited.

Other keyboard keys may be utilized to provide further navigational abilities. For example, the left and/or up arrows may be used to navigate back to an item of information or connection that is closer to the central node. Similarly, the right and down arrows may be used to navigate to an item of information and/or connection that is further away from the central node. In some implementations, at any time during the navigation, the user may provide a specific input to make a secondary node (e.g., a non-central node) a focal node. For example, while at step 3, the enter key may be pressed to make "Survey" the focal point of the graph. Upon receiving such an input, underlying data regarding connections between the various items of information may be accessed and used to reorganize the graph in such a way to make "Survey" the central node.

It should be noted that although keyboard input is discussed above, user input may take various forms and may be received from a variety of input devices. For example, audio commands may be used in some implementations. In such implementations, the audio commands may be processed by speech recognition mechanisms and converted to text which may be further processed to detect commands such as proceed to the next connection. In another example, the user may be able to assign specific functions to desired keyboard keys (e.g., assign the space bar for use in navigation between items of information).

Figure 4:
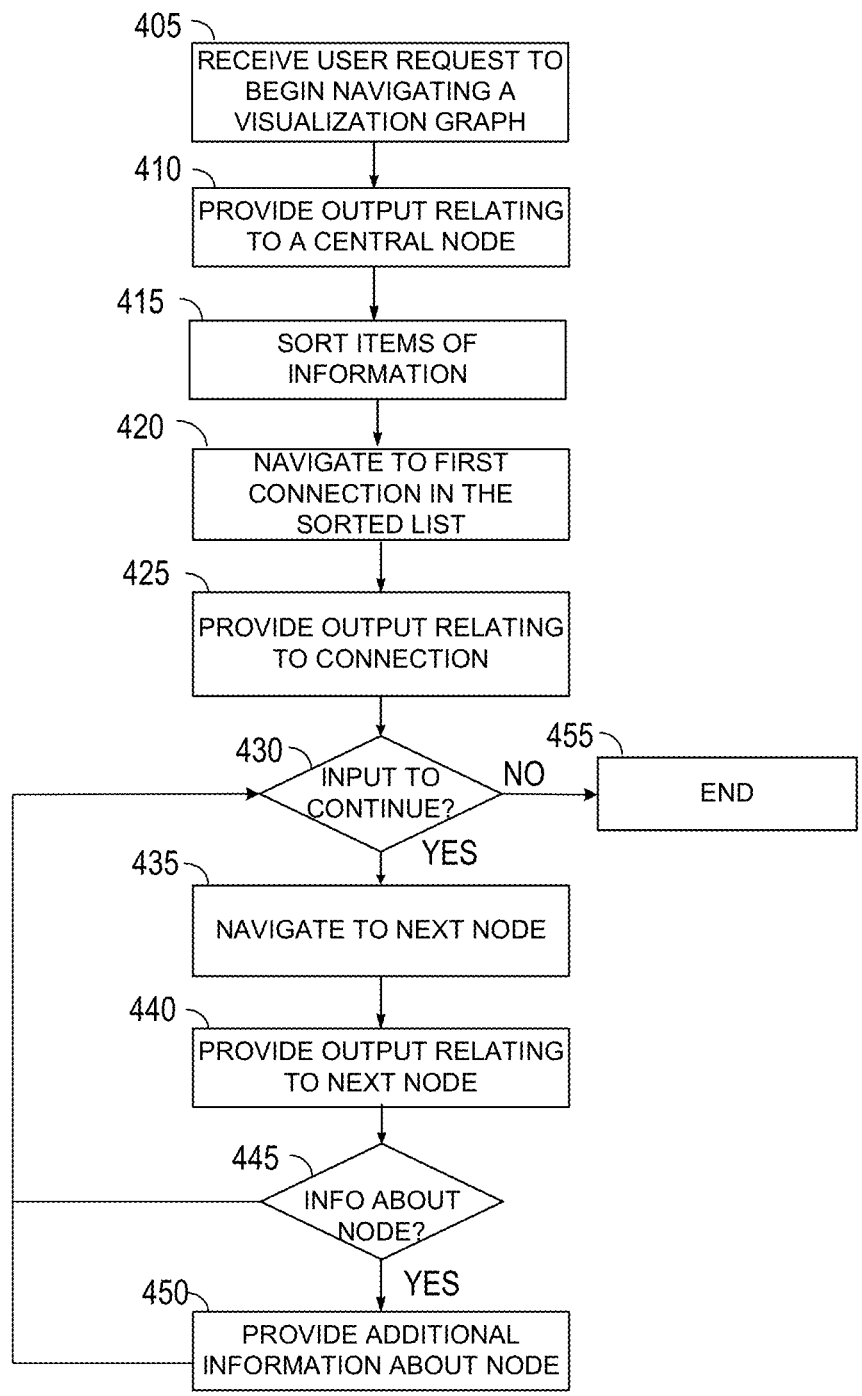
FIG. 4 is a flow diagram showing an example of a method for analyzing and presenting changes in respondent ratings.

FIG. 4 is a flow diagram depicting an exemplary method 400 for providing accessibility to a knowledge network visualization graph. In an example, one or more steps of method 400 may be performed by an application (e.g., application 126 of FIG. 1), a user agent (e.g., user agent 124 of FIG. 1) and/or a knowledge network service (e.g., knowledge network service 112 of FIG. 1).

At 405, method 400 may begin by receiving a user request to begin navigating a knowledge network visualization graph. The user request may be received via user input provided by an input device such as a keyboard, and may include specific input (e.g., pressing a specific key on the keyboard) for initiating navigation of the graph. Upon receiving the user input, method 400 may proceed to provide an output to the user, at 410. The output may relate to the central node of the visualization graph. This may involve first identifying the central node in the visualization graph. The central node is often displayed at the center of the visualization graph and is the item of information that is central to the visualization graph's connections. The output provided may be an audio output or any other type of output that can provide information to a visually impaired user and may include information that identifies the central node and/or its connections to other items of information.

After providing the output, method 400 may proceed to sort the items of information according to the type and/or strength of their connections to the central item of information, at 415. This may involve accessing data used to create the visualization graph to determine the types and strengths of connection between the central item of information and each of the other items of information in the graph. For example, the application displaying the visualization graph may send a request to and receive information from a knowledge network service that provides the display data for the visualization graph. Alternatively, the visualization graph may be processed based on the visual cues provided on the graph to identify the types and/or strength of connections between various items of information. For example, graph 300 of FIG. 3 may be analyzed to determine that the topics "Survey", "Mapping" and "Structural Integrity" are confirmed connections for "Project Speed." This may be determined based on the color of the nodes (e.g., dark circles). Subsequently, the width of the connecting lines between "Project Speed" and each of those topics may be examined to determine the order of strength. This information may be used to sort the connections between the different items of information. The resulting sorted data may be used to navigate the graph.

Once the sorted list is prepared, method 400 may proceed to navigate to the first connection in the sorted list, at 420. This may be the strongest first degree connection and as such may relate to the connecting line between the central item of information and the other item of information to which central item is most closely connected (e.g., confirmed connection and/or strongest connection). Upon navigating to this connection, method 400 may proceed to provide an output relating to the connection, at 425. The output may offer information about the connection and may include audio output. After navigating to the first connection in the sorted list, method 400 may determine if additional user input for continuing navigation is received, at 630.

In alternative implementations, once started, the navigation continues automatically until a user input is received to pause or stop the navigation. For example, the user may press a key (such as an enter key on a central node) to initiate navigation and the navigation process may continue between the different nodes until a user request to stop or pause the process is received.

Upon determining that user input for continuing navigation has been received (yes at 430), method 400 may navigate to the next node (e.g., next item of information in the sorted list), at 435. Upon navigation to the next node, method 400 may provide an output relating to that node, at 440. The output may include an audio output which offers information about the node and its connections. When it is determined that an input to continue has not been received (no at 430), method 400 may proceed to end, at 455.

After an output about the node has been provided, at 440, method 400 may determine if a user input to receive additional information about the node has been received, at 445. When it is determined that additional information has been requested (yes at 445), method 400 may proceed to provide the additional information, at 450, before returning to step 430 to determine if another user input to continue navigation has been received. If it is determined that a user request for additional information has not been received (no at 445), method 400 may also return to step 430 to determine if another user input to continue has been received. In this manner, navigation may continue based on the strength and type of connection between each item of information and the central node, as requested by the user. During navigating the visualization graph based on the type and strength of connections, the user can gain information about the central nodes relationships with each of the additional nodes without the need to view the visualization graph. This provides an easy to use and understand mechanism for gaining access to complex visualization maps that are otherwise inaccessible to certain users.

Figure 5:
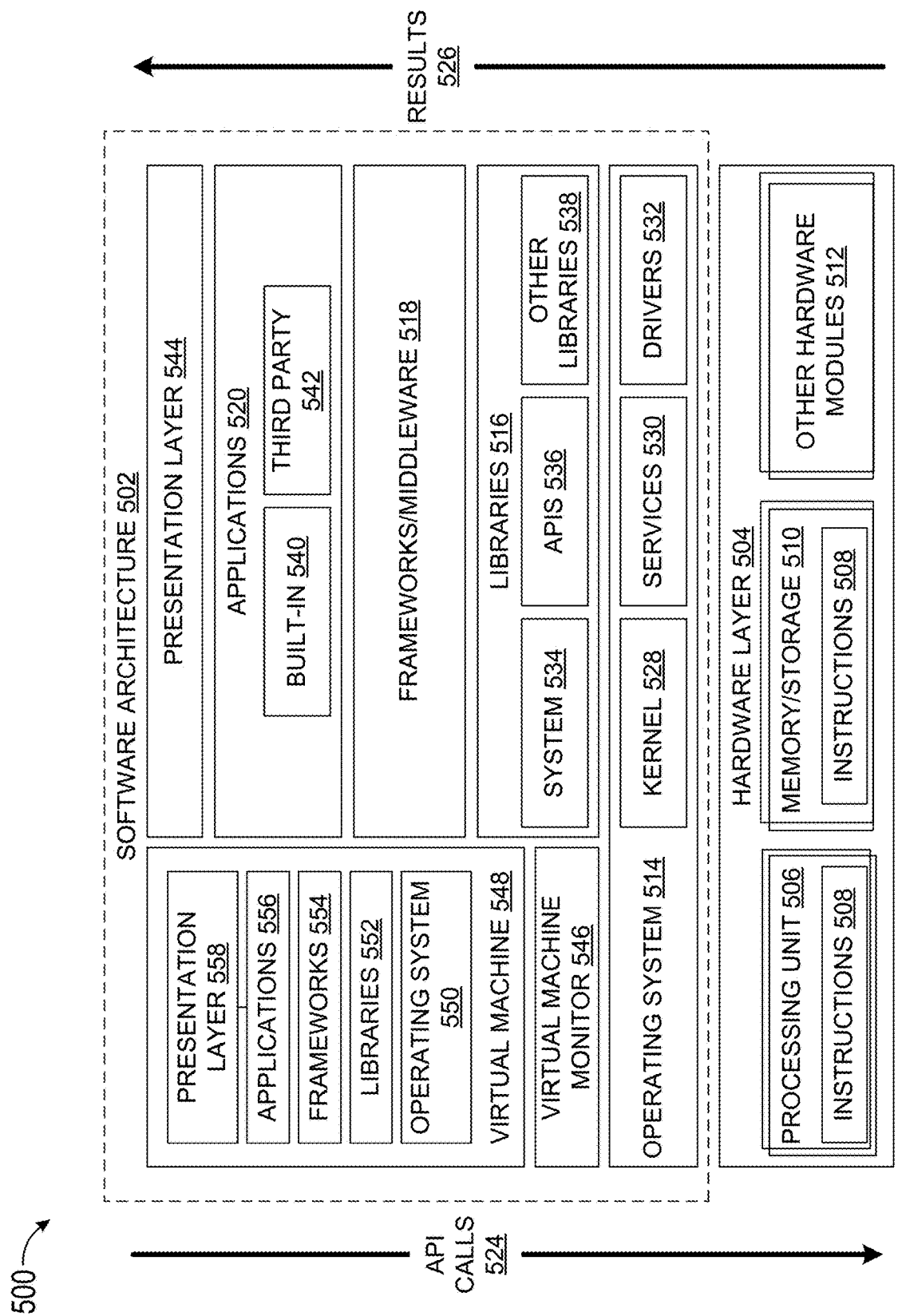
FIG. 5 is a block diagram illustrating an example of software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/ modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
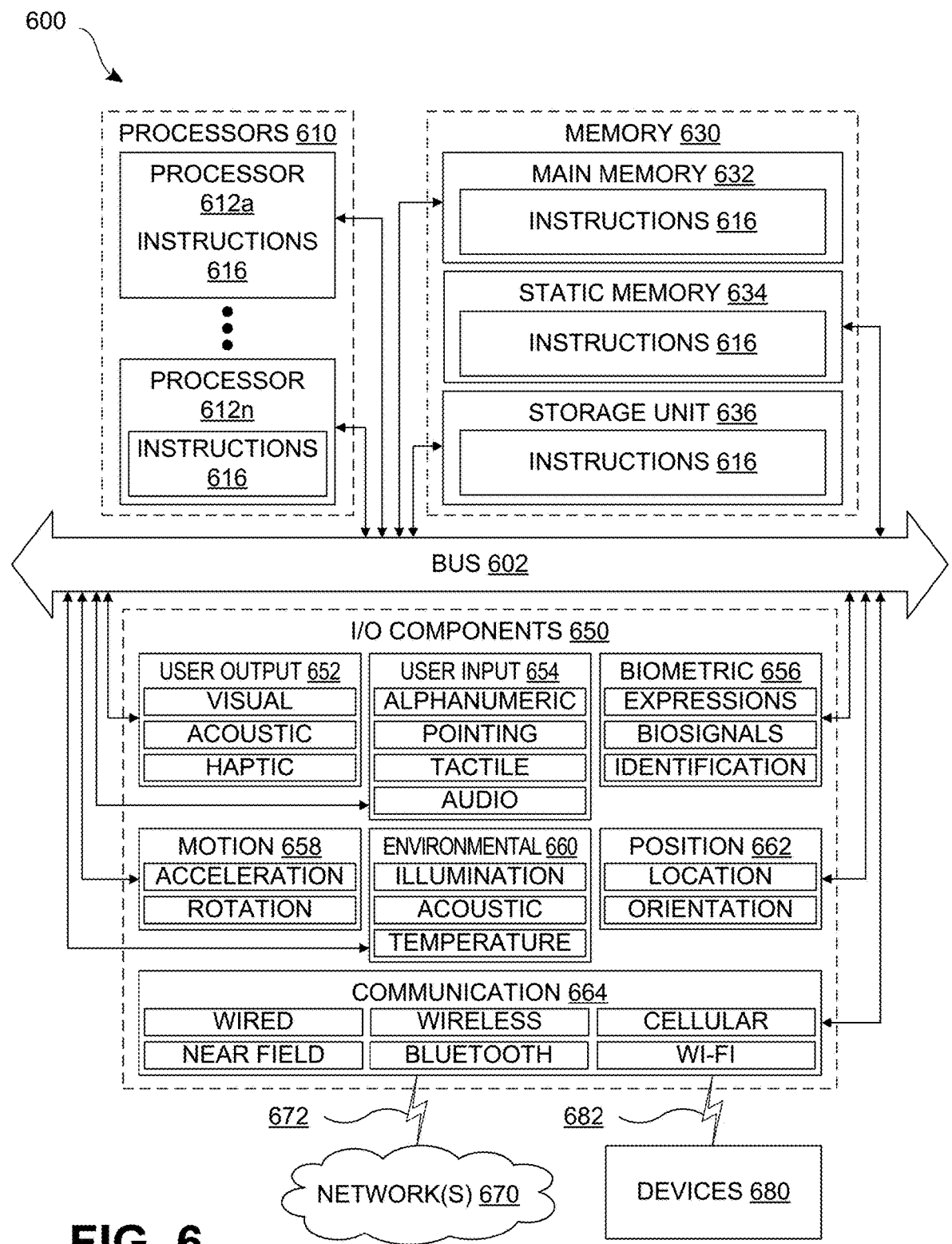
FIG. 6 is a block diagram illustrating components of an example of a machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
   a processor; and
   a memory in communication with the processor, the memory comprising executable instructions that, when executed by the processor, cause the data processing system to perform functions of:
      receiving a request to begin navigating a visualization graph, the visualization graph displaying a plurality of items of information, each item of information being displayed as a node and the visualization graph representing a connection between nodes;
      identifying a central node in the visualization graph;
      determining a navigation order for the visualization graph based on at least one of a strength of the connection and a type of the connection between an item of information associated with the central node and items of information associated with non-central nodes;
      starting to navigate the visualization graph at the central node;
      continuing to navigate the visualization graph to the non-central nodes in accordance with the determined navigation order; and
      providing an audio output during navigation of the visualization graph to provide accessibility to the visualization graph for visually impaired individuals.

Item 2. The data processing system of item 1, wherein determining a navigation order includes sorting the plurality of items of information based on at least one of the strength of the connection between each non-central node and the central node and the type of connection between each non-central node and the central node.

Item 3. The data processing system of any one of items 1 or 2, wherein the type of connection includes a human-confirmed connection and a computer suggested connection.

Item 4. The data processing system of item 3, wherein continuing navigation comprises:
   navigating from the central node to a non-central node that has a human-confirmed connection to the central node;

determining if there are other non-central nodes that have human-confirmed connections to the central node;

upon determining that there are other non-central nodes that have human-confirmed connections to the central node, continuing navigation to the other non-central nodes having human-confirmed connections to the central node; and upon determining that there are no other non-central nodes that have human-confirmed connections to the central node, navigating to a non-central node that has a computer-suggested connection to the central node.

Item 5. The data processing system of item 4, wherein the order of navigation among the non-central nodes having human-confirmed connections is determined based on the strength of each non-central node's connections to the central node.

Item 6. The data processing system of any one of the preceding items, wherein the request is received from a keyboard.

Item 7. The data processing system of any one of the preceding items, wherein the executable instructions when executed by the processor, further cause the data processing system to perform functions of:

receiving a user input to convert one of the non-central nodes to a new central node; and rearranging the visualization graph to convert the one of the non-central nodes to the new central node.

Item 8. A method for providing accessibility to a visualization graph, comprising:

receiving a request to begin navigating the visualization graph, the visualization graph displaying a plurality of items of information, each item of information being displayed as a node and the visualization graph representing a connection between nodes;

identifying a central node in the visualization graph;

determining a navigation order for the visualization graph based on at least one of a strength of the connection and a type of the connection between an item of information associated with the central node and items of information associated with non-central nodes;

starting to navigate the visualization graph at the central node;

continuing to navigate the visualization graph to the non-central nodes in accordance with the determined navigation order; and providing an audio output during navigation of the visualization graph to provide accessibility to the visualization graph for visually impaired individuals.

Item 9. The method of item 8, wherein determining a navigation order includes sorting the plurality of items of information based on at least one of the strength of the connection between each non-central node and the central node and the type of connection between each non-central node and the central node.

Item 10. The method of any one of items 8 or 9, wherein the type of connection includes a human-confirmed connection and a computer suggested connection.

Item 11. The method of item 10, wherein continuing navigation comprises:

navigating from the central node to a non-central node that has a human-confirmed connection to the central node;

determining if there are other non-central nodes that have human-confirmed connections to the central node;

upon determining that there are other non-central nodes that have human-confirmed connections to the central node, continuing navigation to the other non-central nodes having human-confirmed connections to the central node; and upon determining that there are no other non-central nodes that have human-confirmed connections to the central node, navigating to a non-central node that has a computer-suggested connection to the central node.

Item 12. The method of item 11, wherein the order of navigation among the non-central nodes having human-confirmed connections is determined based on the strength of each non-central node's connections to the central node.

Item 13. The method of any one of items 8-12, wherein the request is received from a keyboard.

Item 14. The method of any one of items 8-13, further comprising:

receiving a user input to convert one of the non-central nodes to a new central node; and rearranging the visualization graph to convert the one of the non-central nodes to the new central node.

Item 15. A non-transitory computer readable medium on which are stored instructions that, when executed, cause a programmable device to:

receive a request to begin navigating a visualization graph, the visualization graph displaying a plurality of items of information, each item of information being displayed as a node and the visualization graph representing a connection between nodes;

identify a central node in the visualization graph;

determine a navigation order for the visualization graph based on at least one of a strength of the connection and a type of the connection between an item of information associated with the central node and items of information associated with non-central nodes;

start to navigate the visualization graph at the central node;

continue to navigate the visualization graph to the non-central nodes in accordance with the determined navigation order; and providing an audio output during navigation of the visualization graph to provide accessibility to the visualization graph for visually impaired individuals.

Item 16. The non-transitory computer readable medium of item 15, wherein determining a navigation order includes sorting the plurality of items of information based on at least one of the strength of the connection between each non-central node and the central node and the type of connection between each non-central node and the central node.

Item 17. The non-transitory computer readable medium of any one of items 15 or 16, wherein the type of connection includes a human-confirmed connection and a computer suggested connection.

Item 18. The non-transitory computer readable medium of item 17, wherein to continue navigation comprises:

navigate from the central node to a non-central node that has a human-confirmed connection to the central node;

determine if there are other non-central nodes that have human-confirmed connections to the central node;

upon determining that there are other non-central nodes that have human-confirmed connections to the central node, continue to navigate to the other non-central nodes having human-confirmed connections to the central node; and upon determining that there are no other non-central nodes that have human-confirmed connections to the central node, navigate to a non-central node that has a computer-suggested connection to the central node.

Item 19. The non-transitory computer readable medium of item 18, wherein the order of navigation among the non-central nodes having human-confirmed connections is determined based on the strength of each non-central node's connections to the central node.

Item 20. The non-transitory computer readable medium of any one of items 15-19, wherein the request is received from a keyboard.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
   receiving a request to begin navigating a visualization graph, the visualization graph displaying a plurality of items of information, each of the plurality of items of information being displayed as a node and the visualization graph representing a connection between nodes;
   identifying a central node in the visualization graph;
   in response to identifying the central node, automatically and without user input determining a navigation order for the visualization graph based on at least one of a strength of the connection and a type of the connection between an item of information associated with the central node and items of information associated with non-central nodes;
   assisting a user to dynamically navigate the visualization graph by starting to navigate the visualization graph at the central node and continuing to navigate the visualization graph to the non-central nodes in accordance with the determined navigation order and in response to user input; and
   as the user begins navigating the visualization graph in accordance with the determined navigation order, providing an audio description of the node or the connection in the visualization graph at one or more steps in the navigation to provide accessibility to the visualization graph for visually impaired individuals;
   wherein the strength of connection between the item of information associated with the central node and an item of information associated with a non-central node is determined by analyzing at least one of a number of people who have confirmed the connection, a number of people who are associated with both the item of information associated with the central node and the item of information associated with the non-central node.

2. The data processing system of claim 1, wherein determining a navigation order includes sorting the plurality of items of information based on at least one of the strength of the connection between each non-central node and the central node and the type of connection between each non-central node and the central node.

3. The data processing system of claim 1, wherein the type of connection includes a human-confirmed connection and a computer suggested connection.

4. The data processing system of claim 3, wherein continuing navigation comprises:
   navigating from the central node to a non-central node that has a human-confirmed connection to the central node;
   determining that there are other non-central nodes that have human-confirmed connections to the central node; and upon determining that there are other non-central nodes that have human-confirmed connections to the central node, continuing navigation to the other non-central nodes having human-confirmed connections to the central node.

5. The data processing system of claim 4, wherein the order of navigation among the non-central nodes having human-confirmed connections is determined based on the strength of each non-central node's connections to the central node.

6. The data processing system of claim 1, wherein the request is received from a keyboard.

7. The data processing system of claim 1, wherein the executable instructions when executed by the processor, further cause the data processing system to perform functions of:
receiving a user selection to convert one of the non-central nodes to a new central node; and
rearranging the visualization graph to convert the one of the non-central nodes to the new central node.

8. A method for providing accessibility to a visualization graph, comprising:
receiving a request to begin navigating the visualization graph, the visualization graph displaying a plurality of items of information, each of the plurality of items of information being displayed as a node and the visualization graph representing a connection between nodes;
identifying a central node in the visualization graph;
in response to identifying the central node, automatically and without user input determining a navigation order for the visualization graph based on at least one of a strength of the connection and a type of the connection between an item of information associated with the central node and items of information associated with non-central nodes;
assisting a user to dynamically navigate the visualization graph by starting to navigate the visualization graph at the central node and continuing to navigate the visualization graph to the non-central nodes in accordance with the determined navigation order and in response to user input; and
as the user begins navigating the visualization graph in accordance with the determined navigation order, providing an audio description of the node or the connection in the visualization graph at one or more steps in the navigation to provide accessibility to the visualization graph for visually impaired individuals;
wherein the strength of connection between the item of information associated with the central node and an item of information associated with a non-central node is determined by analyzing at least one of a number of people who have confirmed the connection, a number of people who are associated with both the item of information associated with the central node and the item of information associated with the non-central node.

9. The method of claim 8, wherein determining a navigation order includes sorting the plurality of items of information based on at least one of the strength of the connection between each non-central node and the central node and the type of connection between each non-central node and the central node.

10. The method of claim 8, wherein the type of connection includes a human-confirmed connection and a computer suggested connection.

11. The method of claim 10, wherein continuing navigation comprises:
navigating from the central node to a non-central node that has a human-confirmed connection to the central node;
determining that there are no other non-central nodes that have human-confirmed connections to the central node; and
upon determining that there are no other non-central nodes that have human-confirmed connections to the central node, navigating to a non-central node that has a computer-suggested connection to the central node.

12. The method of claim 11, wherein the order of navigation among the non-central nodes having human-confirmed connections is determined based on the strength of each non-central node's connections to the central node.

13. The method of claim 8, wherein the request is received from a keyboard.

14. The method of claim 8, further comprising:
receiving a user selection to convert one of the non-central nodes to a new central node; and
rearranging the visualization graph to convert the one of the non-central nodes to the new central node.

15. A non-transitory computer readable medium on which are stored instructions that, when executed, cause a programmable device to:
receive a request to begin navigating a visualization graph, the visualization graph displaying a plurality of items of information, each of the plurality of items of information being displayed as a node and the visualization graph representing a connection between nodes;
identify a central node in the visualization graph;
in response to identifying the central node, automatically and without user input determine a navigation order for the visualization graph based on at least one of a strength of the connection and a type of the connection between an item of information associated with the central node and items of information associated with non-central nodes;
assist a user to dynamically navigate the visualization graph by starting to navigate the visualization graph at the central node and continuing to navigate the visualization graph to the non-central nodes in accordance with the determined navigation order and in response to user input; and
as the user begins navigating the visualization graph in accordance with the determined navigation order, provide an audio description of the node or the connection in the visualization graph at one or more steps in the navigation to provide accessibility to the visualization graph for visually impaired individuals;
wherein the strength of connection between the item of information associated with the central node and an item of information associated with a non-central node is determined by analyzing at least one of a number of people who have confirmed the connection, a number of people who are associated with both the item of information associated with the central node and the item of information associated with the non-central node.

16. The non-transitory computer readable medium of claim 15, wherein determining a navigation order includes sorting the plurality of items of information based on at least one of the strength of the connection between each non-central node and the central node and the type of connection between each non-central node and the central node.

17. The non-transitory computer readable medium of claim 15, wherein the type of connection includes a human-confirmed connection and a computer suggested connection.

18. The non-transitory computer readable medium of claim 17, wherein to continue navigation comprises:
- navigate from the central node to a non-central node that has a human-confirmed connection to the central node;
- determine that there are other non-central nodes that have human-confirmed connections to the central node; and
- upon determining that there are other non-central nodes that have human-confirmed connections to the central node, continue to navigate to the other non-central nodes having human-confirmed connections to the central node.

19. The non-transitory computer readable medium of claim 18, wherein the order of navigation among the non-central nodes having human-confirmed connections is determined based on the strength of each non-central node's connections to the central node.

20. The non-transitory computer readable medium of claim 15, wherein the request is received from a keyboard.

* * * * *